United States Patent [19]

Meade et al.

[11] Patent Number: 5,624,575
[45] Date of Patent: Apr. 29, 1997

[54] METHOD FOR PREVENTING MICROBIAL DEPOSITS IN THE PAPERMAKING PROCESS WITH ETHYLENE OXIDE/ PROPYLENE OXIDE COPOLYMERS

[75] Inventors: Robert J. Meade, Naperville; Linda R. Robertson, St. Charles; Nicole R. Taylor, Berkeley; Judy G. LaZonby, Crystal Lake, all of Ill.

[73] Assignee: Nalco Chemical Company, Naperville, Ill.

[21] Appl. No.: 508,659

[22] Filed: Jul. 28, 1995

Related U.S. Application Data

[63] Continuation-in-part of Ser. No. 430,629, Apr. 28, 1995.

[51] Int. Cl.$^6$ .................................................. C02F 1/50
[52] U.S. Cl. ...................... 210/759; 210/764; 210/928
[58] Field of Search .......................... 210/764, 749, 210/759, 928

[56] References Cited

U.S. PATENT DOCUMENTS

| | | |
|---|---|---|
| 3,824,184 | 7/1974 | Hatcher et al. . |
| 4,295,932 | 10/1981 | Pocius .................................... 162/161 |
| 4,643,835 | 2/1987 | Koeplin-Gall et al. ................ 210/754 |
| 4,684,469 | 8/1987 | Pedersen et al. . |
| 4,759,852 | 7/1988 | Trulear .................................. 210/754 |
| 4,770,790 | 9/1988 | Oberhofer ............................. 210/673 |
| 4,872,999 | 10/1989 | Schild et al. ........................... 210/754 |
| 5,071,765 | 12/1991 | Wiatr . |
| 5,128,133 | 7/1992 | Hidaka et al. ......................... 424/405 |
| 5,198,453 | 3/1993 | LaZonby et al. . |
| 5,209,824 | 5/1993 | LaZonby . |
| 5,324,432 | 6/1994 | Robertson et al. .................... 210/632 |
| 5,368,749 | 11/1994 | LaZonby . |
| 5,395,530 | 3/1995 | Robertson et al. .................... 210/632 |
| 5,494,588 | 2/1996 | LaZonby ................................ 210/755 |

OTHER PUBLICATIONS

*Tackling the Slime Problem in a Paper–Mill*, Safade, PTI, p. 280, Sep. 1988.
*The Use of Phase–Contrast Microscopy to Assess and Differentiate the Microbial Population of a Paper Mill*, TAPPI Journal, p. 83, Mar. 1993.

*Primary Examiner*—Neil M. McCarthy
*Attorney, Agent, or Firm*—Robert A. Miller; James J. Drake; Patricia A. Charlier

[57] ABSTRACT

The present invention relates generally to controlling the growth of microorganisms, including the inhibition of the growth of filamentous microorganisms in industrial process waters. The invention is directed to a method for preventing and removing the formation of deposits by microorganisms in the wet end of a paper machine with a combination of peracetic acid and an ethylene oxide/propylene oxide copolymer.

13 Claims, 3 Drawing Sheets

FIG. 1

| Average Response | COMPOUND B | COMPOUND C | COMPOUND D | COMPOUND E | COMPOUND A |
|---|---|---|---|---|---|
| | 2.88 | 2.80 | 2.72 | 2.50 | 0.60 |

Dose 5 ppm

METHOD FOR PREVENTING MICROBIAL DEPOSITS IN THE PAPERMAKING PROCESS WITH ETHYLENE OXIDE/PROPYLENE OXIDE COPOLYMERS

REFERENCE TO RELATED PATENT

The present application is a continuation-in-part of Ser. No. 08/430,629, filed Apr. 28, 1995, by Robert J. Meade, Linda R. Robertson and Nicole R. Taylor, entitled "Method for Preventing Microbial Deposits in the Wet End of Papermachines", the disclosure of which is incorporated herein by reference.

FIELD OF THE INVENTION

The present invention relates generally to controlling the growth of microorganisms, including the inhibition of the growth of filamentous microorganisms in industrial process waters. The invention is directed to a method for preventing and removing the formation of deposits by microorganisms in the wet end of a paper machine with a combination of peracetic acid and an ethylene oxide/propylene oxide copolymer.

BACKGROUND OF THE INVENTION

Biofouling in industrial waters, which occurs as a result of the presence of microorganisms, is a significant concern for industrial manufacturers. Industrial processes subject to problems with biofouling include those used for the manufacture of pulp, paper, paperboard, and textiles, particularly water-laid nonwoven textiles. Other examples of industrial waters where microorganisms can interfere with industrial processes include cooling tower waters, minting process waters, food processing waters, sugar reprocessing waters, and wine or brewery waters. For example, in the manufacture of paper, paper machines handle very large volumes of water in recirculating systems called "white water systems." The furnish to a paper machine typically contains only about 0.1–2% of fibrous and nonfibrous papermaking solids, which means that for each ton of paper a very large amount of water passes through the headbox of which most is recirculated in the white water system.

The presence of microorganisms within industrial water systems results in the formation of deposits of biological origin on industrial machines. These formation deposits give rise to: corrosion, breaks, increased down time, loss of yield, high chemical costs, odors, and expensive deposit control programs. In the paper mill industry, slime deposits are reportedly responsible for nearly 70% of all breaks, blockages and pump failures. Safade, *Tackling the Slime Problem in a Paper-Mill*. PTI, p. 280 (September 1988). Slime may be defined as an "accretion or accumulation caused by certain microorganisms in the presence of pulp fiber, filler, dirt and other materials, mixed in varied proportions, having variable physical characteristics and accumulating at continuous changing rates." Id. An excellent growth media for microorganisms is provided because of the warm temperatures and rich carbohydrate containing fluids of paper machines which provide ideal growth conditions. The contaminating microorganisms are capable of causing spoilage of pulp, furnish, or chemical additives, because of the build-up of slime masses in headboxes, waterlines and papermaking equipment. When deposits break loose and fall into the paper furnish, they result in quality loss or end product defects such as holes and spots. Bad odors in the paper and web breaks which can cause costly disruptions in paper machine operations are among the other detrimental effects of microbial growth. The end result is unsalable paper or paper sold at a lower value. Robertson, *The Use of Phase-Contrast Microscopy to Assess and Differentiate the Microbial Population of a Paper Mill*. TAPPI Journal, p. 83 (March 1993).

The conventional method of controlling microbial growth is through the use of biocides. Biocides are generally divided into two main groups: oxidizing; and non-oxidizing. These biocides act on the microorganisms in one of three ways: either by attacking the cell wall, the cytoplasmic membrane, or the cellular constituents. Id. at 282.

To control biological fouling, it is common in the art to treat the affected water systems with certain chemical substances in concentrations sufficient to kill or greatly inhibit the growth of the causative organisms. For example, chlorine gas and hypochlorite solutions made with the gas have long been added to water systems, to kill or inhibit the growth of bacteria, fungi, algae, and other troublesome organisms. However, chlorine compounds are not only damaging to materials of construction, but they also react with organics to form undesirable substances in effluent streams, such as carcinogenic chloromethanes and chlorinated dioxins.

Certain organic compounds, such as methylenebis (thiocyanate), dithiocarbamates, haloorganics, and quaternary ammonium surfactants, have also been used. While many of these are quite efficient in killing microorganisms or inhibiting their growth, they also tend to be toxic or harmful to humans, animals, or other non-target organisms; as well as expensive.

Glutaraldehyde in combination with various other biocides is described in U.S. Pat. Nos. 5,368,749, 5,198,453, and 5,209,824 for the controlling of microorganisms found in industrial process waters.

As an alternative to treatment with biocides, researchers posited the use of enzymes to control slime accumulation. U.S. Pat. No. 3,824,184 to Herbert J. Hatcher describes to the addition of levan hydrolase to industrial waters having a slime accumulation or potential slime problem. Similar to using a mixture of various biocides, the use of a multiple enzyme blend to control industrial slime is also known. See U.S. Pat. No. 5,071,765 to Christopher L. Wiatr. However, field trials indicate that these enzymatic treatments are ineffective in papermaking applications.

While a biocide or an enzyme alone inhibits slime growth, researchers report that the combination of a biocide and an enzyme together provides even greater benefits. For example, U.S. Pat. No. 4,684,469 to Pederson et al. discloses to the combination of a biocide and a polysaccharide-degrading enzyme to reduce slime accumulations. However, though the combination of the biocide and the levan hydrolase may provide increased control against some sorts of slime growth, it has no effect on sheathed microorganisms.

Combinations other than that of biocide and enzyme have also found utility in the prevention of microbiological fouling. Surfactants, such as ethylene oxide/propylene oxide (EO/PO) copolymers have been utilized in conjunction with biocides to control slime formation in the papermaking industry. U.S. Pat. No. 5,128,133 to Hidaka et al. discloses the use of the non-oxidizing biocides 4,5-dichloro-1,2-dithiol-3-one and N-dodecyl guanidine hydrochloride or N-dodecyl guanidine acetate, and recommends the concurrent addition of a surfactant such as an ethylene oxide/propylene oxide copolymer. U.S. Pat. No. 4,770,790, to Oberhofer discloses a process for improving performance of water treatment solids which can be fouled with microorganisms by treatment with a biocide, a nonionic surfactant and a biodispersant. Oxidative biocides used in conjunction with ethylene oxide/propylene oxide adducts are described therein, yet only halogenated oxidative biocides are disclosed. Further, U.S. Pat. No. 4,295,932 to Pocius discloses a method for controlling aqueous systems heavily contaminated with microorganisms comprising treating the system with a non-oxidizing halogenated biocides and a biodispersant EO/PO copolymer.

Another difficulty with conventional treatments is that they often fail to recognize the problems caused by filamentous microorganisms in water systems. A group of microorganisms, including the filamentous bacteria, enter industrial systems via the fresh waters. In a typical treatment program, the proper chlorination of waters is always recommended as a means to kill these microorganisms before they enter the system. Unfortunately, proper chlorination is often not a viable option since many of the filamentous bacteria have, a protective sheath that shields them from antimicrobial agents. In fact, research has shown that 85% of the paper machine deposit samples for alkaline mills currently show filamentous bacteria as one of the major portions of the deposit matrix, despite conventional biocidal treatment. One solution to the problems presented by the presence of filamentous bacteria in industrial process waters is disclosed in U.S. Pat. Nos. 5,324,432 and 5,395,530. The method disclosed in these patents is the addition of an effective amount of an enzyme and a biocide to enhance the kill of filamentous microorganisms.

Nonetheless, a need exists for improved methods for controlling the growth of microorganisms in industrial process waters, including the filamentous microorganisms. A treatment such as the non-halogenated oxidative biocide in combination with a biodispersant that the Applicants disclose herein is desirable because of its low cost, decreased toxicity to the environment, and activity against a greater variety of microorganisms.

BRIEF DESCRIPTION OF THE DRAWINGS

FIG. 1 is a graph comparing the efficacy of various molecular weight EO/PO polymers at a 5 ppm dosage.

SUMMARY OF THE INVENTION

Figure 2:
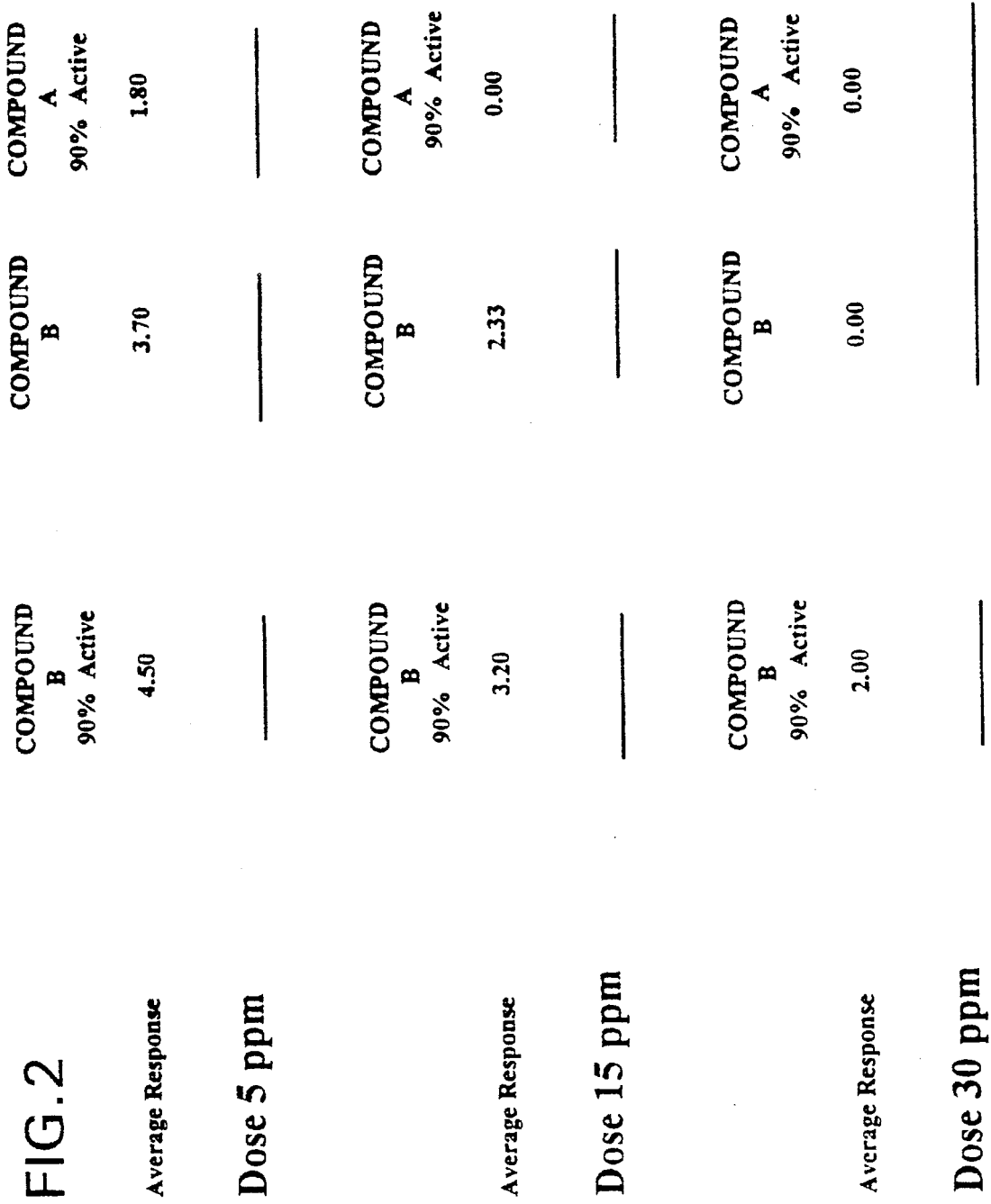
FIG. 2 is a graph comparing the efficacy of two different EO/PO polymers at various dosages.

The present invention relates generally to controlling the growth of microorganisms, including the inhibition of the growth of filamentous microorganisms in industrial process waters. The invention is directed to a method for preventing and removing the formation of deposits by microorganisms in the wet end of a paper machine with a combination of peracetic acid and an ethylene oxide/propylene oxide copolymer.

DESCRIPTION OF THE PREFERRED EMBODIMENTS

The present invention provides a method of preventing the buildup of microorganisms, wood fiber and fillers on paper machine surfaces. It is generally noted in the industry that contaminants, such as microorganisms, wood fiber and fillers, can reduce the efficiency of a papermachine.

The optimal amounts of PAA and EO/PO copolymer required for effectiveness in this invention depend upon the type of water treated. In addition, the concentration of the combined components varies greatly and can depend upon the conditions of the system to be treated such as temperature and pH of the water, and the microbial count.

Peracetic acid is available from a number of manufacturers including Solvay-Interox, in Houston, Tex.; FMC, in Philadelphia, Pa.; and Ecolab, in St. Paul, Minn.

Ethylene oxide/propylene oxide copolymers may be synthesized by well-known techniques involving the controlled addition of propylene oxide to the hydroxyl groups of propylene glycol. Ethylene glycol is then added to sandwich this hydrophobe between hydrophilic groups. The percent of ethylene oxide, in the copolymer of the invention is preferably from about 5 to 30% (by weight) of the final polymer. More preferably, the percent of ethylene oxide in the copolymer of the invention is from about 5 to 20% (by weight) of the final polymer. Most preferably, the percent of ethylene oxide in the copolymer of the invention is from about 5 to 15% (by weight) of the final polymer.

The ethylene oxide/propylene oxide copolymers of the invention will contain less than 1 percent by weight of an initiator compound. An initiator is a compound used during synthesis which acts, as a nucleus for the attachment of the ethylene oxide and propylene oxide. Examples of initiators include ethylene glycol, propylene glycol and ethylene diamine. The EO/PO copolymer of the present invention, which is not a biocide, and has no biocidal effect, prevents microbial adhesion to papermachine surfaces and the formation of a biofilm.

The invention is a method for controlling the growth of filamentous bacteria and other microorganisms in industrial process water containing filamentous bacteria and other microorganisms which comprises treating said water with an effective amount of peracetic acid and an effective amount of an ethylene oxide/propylene oxide copolymer simultaneously.

The industrial process water to be treated may be from a pulp and paper mill. Further, the treated water from a pulp and paper process is selected from the group consisting of fresh water, white water, broke, pulp and stock chest water. The peracetic acid and ethylene oxide/propylene oxide copolymer are added to the pulp and paper mill at an addition point selected from the group consisting of incoming water, white water silo and tray water.

The peracetic acid and the ethylene oxide/propylene oxide copolymer are added in a ratio of from about 45:1 to 1:25. Preferably, the peracetic acid and the EO/PO copolymer are added in a ratio of from about 10:1 to 1:10. Most preferably, the peracetic acid and the EO/PO copolymer are added in a ratio of from about 1:5 to 1:1. The EO/PO copolymer has a molecular weight of from 1,000 daltons to 10,000 daltons. Preferably, the EO/PO copolymer has a molecular weight of from 1,000 daltons to 5,000 daltons. Most preferably, the EO/PO copolymer has a molecular weight of from 2,000 daltons to 4,000 daltons.

The amount of peracetic acid added ranges from approximately 0.05 to 1,000 ppm and the amount of ethylene oxide/propylene oxide copolymer added ranges from approximately 0.1 to 1,000 ppm. Preferably, the amount of peracetic acid added ranges from approximately 0.1 to 500 ppm and the amount of ethylene oxide/propylene oxide copolymer added ranges from approximately 0.5 to 500 ppm. Most preferably, the amount of peracetic acid added ranges from approximately 1 to 20 ppm and the amount of ethylene oxide/propylene oxide copolymer added ranges from approximately 1 to 20 ppm.

Another aspect of the invention is a method of preventing the build-up of deposit-forming microorganisms and inorganic materials in a papermachine fluid containing filamentous bacteia and other microorganisms, the method comprising the step of treating the paper machine fluid with 0.1 to 100 parts per million of an ethylene oxide/propylene oxide copolymer having a molecular weight of from about 2550 to about 3550 daltons. The percent of the ethylene oxide in the copolymer may be from about 5 to 30%. Further, the solution may include a glycol.

That glycol may be selected from the group consisting of diethylene glycol, ethylene glycol, propylene glycol, diethylene glycol monobutyl ether, ethylene glycol monobutyl ether, propylene glycol monobutyl ether, diethylene glycol monoethyl ether, ethylene glycol monoethyl ether, diethylene glycol monohexyl ether, propoxy propanol, ethylene glycol monohexyl ether, diethylene glycol monomethyl ether, propylene glycol methyl ether, dipropylene glycol methyl ether, and tripropylene glycol methyl ether.

The solvents of the invention are included in the formulations of the invention and in an amount of from about 99 to 0 weight percent. More preferably, the solvents of the invention are included in the formulations of the invention in an amount of from about 60 to about 0 weight percent; and most preferably, in an amount from about 50 to about 30 weight percent.

Moreover, the aqueous solution further may include a solvent selected from the group consisting of N-methyl pyrrolidone, tetrahydrofuran, tetrahydrofurfuryl alcohol and furfuryl alcohol. The treatment may further comprise adding a compound selected from the group consisting of glutaraldehyde, isothiazolin, methylene bis thiocyanate, thiocyanomethylthio benzothiazole, 2-bromo-2-nitro-1,-3-propane diol, alkyl dimethyl benzyl ammonium chloride and combinations thereof.

The following examples are presented to describe preferred embodiments and utilities of the invention and are not meant to limit the invention unless otherwise stated in the claims appended hereto.

EXAMPLE 1

A filamentous, slime-forming bacterium common to papermills was grown in a modified nutrient medium designed to promote biofilm formation. The uniform inoculum was harvested and aliquots were frozen and stored at −70° C. until needed.

Eight-ounce flush glass jars were rinsed once in acetone and twice in deionized water to remove any surface contaminants. The jars were autoclaved at 121° C. for 15 minutes. One percent solutions of EO/PO copolymers of various molecular weights diluted in ethanol were passed though 0.45 μm filters for sterilization. Predetermined volumes of the EO/PO solutions were added to the appropriate jars and the ethanol was allowed to evaporate under a stream of sterile air. COMPOUND A represents the compound used in the claimed method and has a molecular weight of from about 2550 to about 3550 daltons. COMPOUND B has a molecular weight of about 2000 daltons. COMPOUND C has a molecular weight of about 4400 daltons. COMPOUND D has a molecular weight of about 3800 daltons. COMPOUND E has a molecular weight of about 1100 daltons.

Fifty mL of sterile medium was added to each jar and 100 μl of the thawed bacterial inoculum was added to each jar. The jars were placed into a New Brunswick Series 25 orbital shaker at 35° C. at 210 rpm. After 48 hours of incubation, the biofilms attached and formed at the base of the jars were rated for diameter in centimeters and vigor on a scale of 0 to +4. A geometric mean of diameter and vigor was calculated for each jar. Each experiment was set up with a minimum of three jars per concentration and treatment chemical.

Multiple comparison of treatment affects are displayed in FIGS. 1 and 2. FIG. 1 shows that with COMPOUND A the geometric mean of diameter and vigor at a five ppm dose is significantly better than the other four chemicals in preventing microbial attachment to surfaces since a lower response number for geometric mean indicates a more active chemical.

FIG. 2 shows the same response at 5 and 15 ppm when COMPOUND A is compared to other dispersing chemicals. At 30 ppm this effect diminishes, since both COMPOUND B and COMPOUND A completely prevented adhesion in this study. Overlap indicates no significant difference at 95% Confidence Level.

Figure 3:
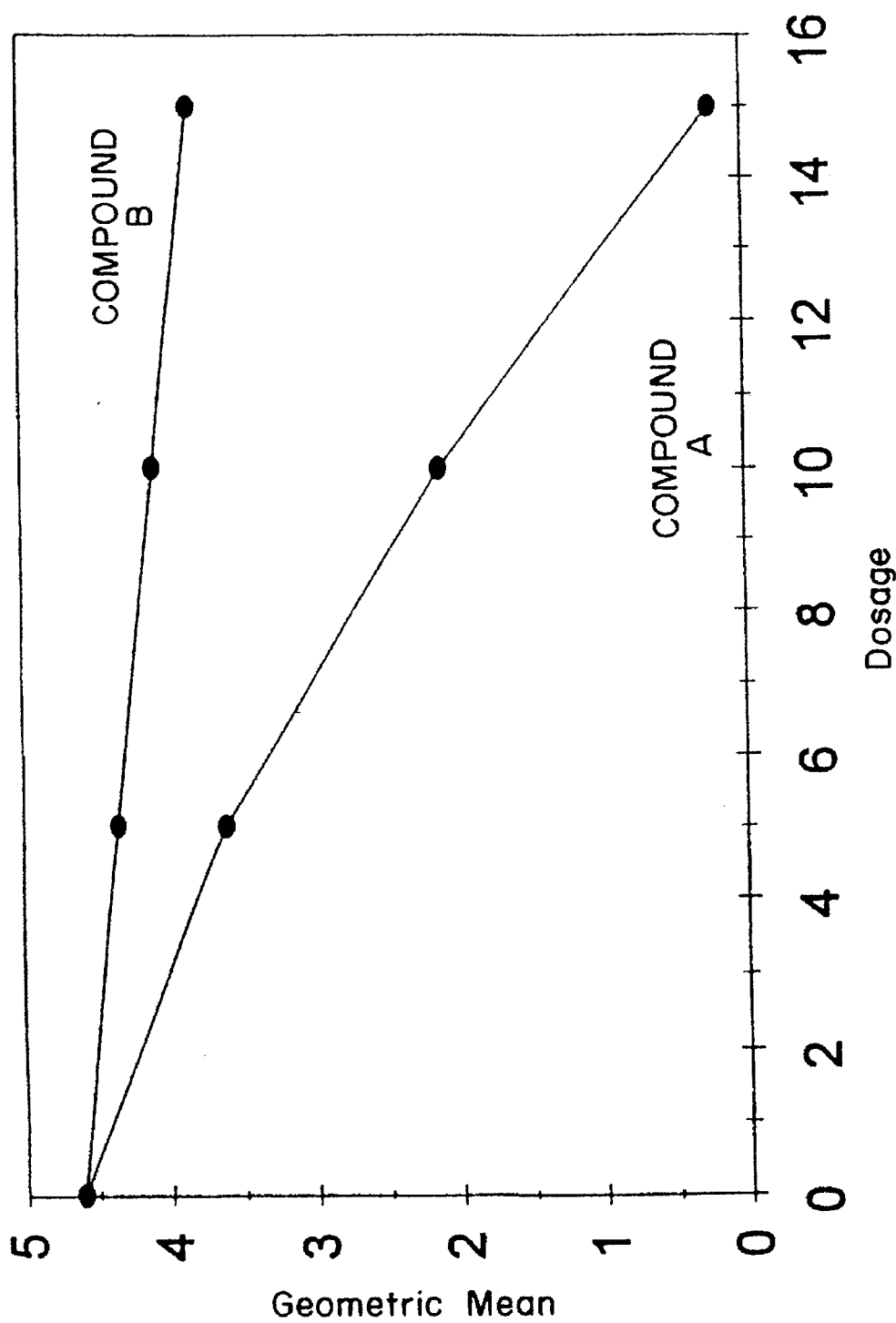
FIG. 3 is a graph comparing the efficacy of two different EO/PO polymers at various dosages.

FIG. 3 compares the activity of the currently marketed COMPOUND B against COMPOUND A in a separate experiment, following the same experimental procedure. COMPOUND A is much better of preventing attachment of the bacteria to surfaces at a lower dose than is COMPOUND B.

EXAMPLE 2

The same experimental procedure was utilized to obtain the results listed in Table I. In a separate experimental run which followed the same procedure, an EO/PO copolymer with a molecular weight of 3400 was tested. The average responses obtained were as follows at 5 ppm: 4.20; at 15 ppm: 3.87 and at 30 ppm: 0.73.

TABLE I

Inhibition of Filamentous Bacteria Attachment

| Polymer[1] | Average Response[2] | | |
|---|---|---|---|
| | 5 ppm dose | 15 ppm dose | 30 ppm dose |
| A | 0.60 | 0.00 | 0.00 |
| B | 2.88 | 0.13 | 0.00 |
| C | 2.80 | — | 0.49 |
| D | 2.72 | — | 1.10 |
| E | 2.50 | 3.26 | 2.53 |

[1] = All polymers are ethylene oxide/propylene oxide copolymers.
[2] = In the absence of any treatment, geometric mean value obtained was 2.9.

EXAMPLE 3

A field trial was conducted at a midwestern paper mill. Twenty ppm of peracetic acid (PAA) was continuously dosed to the system. Samples of the water taken from various points such as the headbox, tray, white water and saveall were tested for the presence of various microorganisms by a heterotrophic plate count. Decreased planktonic populations are indicated by decreased CFU (colony forming units), as enumerated in Table II. A separate test revealed that fungi levels also dropped. However, by visual examination, slime continued to build on machine surfaces subsequent to PAA treatments. Microscopic evaluations indicated that the slime consisted of filamentous bacteria. Apparently, these bacteria were unaffected by treatment with peracetic acid. Measurements of hydrogen peroxide levels at the various sampling points indicated that the peracetic acid treatment was present throughout the papermill system.

Therefore, though peracetic acid is an effective biocide for most types of microorganisms, it will not have an effect on filamentous bacteria.

TABLE II

Effect of Peracetic Acid on Microorganisms

| Sampling Location[1] | $H_2O_2$ Residual | pH | CFU/ml | Fungi | Filamentous Bacteria[2] |
|---|---|---|---|---|---|
| Headbox | 2.0 | 7.4 | $7.4 \times 10^6$ | 17 | Present |
| Tray | 2.0 | 7.7 | $4.9 \times 10^6$ | 11 | Present |
| Saveall | 0.5 | 7.9 | $7.3 \times 10^6$ | 30 | Present |
| White Water | 0.5 | 7.9 | $4.6 \times 10^6$ | 1 | Present |
| Fresh Water | 0 | 7.9 | 17 | 0 | Absent |

[1] = 20 ppm of PAA was continuously dosed.
[2] = Presence was determined as a result of microscopic examination.

Contemplative Example

We believe that the combination of an EO/PO copolymer which is effective at preventing filamentous bacterial attachment, with peracetic acid which demonstrates biocidal activity against microorganisms with the exception of filamentous bacteria, will provide an excellent method for controlling microorganisms in paper mills. For example, 2 ppm of an EO/PO copolymer and 20 ppm of peracetic acid would be added to the papermaking system. The two compounds may be blended to provide simultaneous addition. Alternatively, they may be added separately to the paper mill process water or incoming fresh water. A continuous addition either separately or simultaneously should drastically decrease all types of microorganisms accumulated during the papermaking process, thus preventing slime build-up on machines. Specifically, a reduction in the attachment of filamentous bacteria to papermaking machines will be evident after addition of the components of the invention by coupon tests, or machine runnability tests such as hole counts.

Changes can be made in the composition, operation and arrangement of the method of the present invention described herein without departing from the concept and scope of the invention as defined in the following claims:

We claim:

1. A method for controlling the growth of filamentous bacteria and other microorganisms in industrial process water containing filamentous bacteria and other microorganisms which consisting of the step of treating said water with an effective amount of peracetic acid and an effective amount of an ethylene oxide/propylene oxide copolymer simultaneously.

2. The method of claim 1 wherein the industrial process water is from a pulp and paper mill.

3. The method of claim 2 wherein the pulp and paper process water is selected from the group consisting of fresh water, white water, broke, pulp and stock chest water.

4. The method of claim 2 wherein the peracetic acid and ethylene oxide/propylene oxide copolymer are added to the pulp and paper mill at an addition point selected from the group consisting of incoming water, white water silo and tray water.

5. The method of claim 3 wherein the peracetic acid and the ethylene oxide/propylene oxide copolymer are added in a ratio of from about 45:1 to 1:25.

6. The method of claim 5 wherein the EO/PO copolymer has a molecular weight of from 1,000 daltons to 10,000 daltons.

7. The method of claim 3 wherein the peracetic acid and the EO/PO copolymer are added in a ratio of from about 10:1 to 1:10.

8. The method of claim 7 wherein the EO/PO copolymer has a molecular weight of from 1,000 daltons to 5,000 daltons.

9. The method of claim 3 wherein the peracetic acid and the EO/PO copolymer are added in a ratio of from about 1:5 to 1:1.

10. The method of claim 9 wherein the EO/PO copolymer has a molecular weight of from 2,000 daltons to 4,000 daltons.

11. The method of claim 5 wherein the amount of peracetic acid added ranges from approximately 0.05 to 1,000 ppm and the amount of ethylene oxide/propylene oxide copolymer added ranges from approximately 0.1 to 1,000 ppm.

12. The method of claim 8 wherein the amount of peracetic acid added ranges from approximately 0.1 to 500 ppm and the amount of ethylene oxide/propylene oxide copolymer added ranges from approximately 0.5 to 500 ppm.

13. The method of claim 10 wherein the wherein the amount of peracetic acid added ranges from approximately 1 to 100 ppm and the amount of ethylene oxide/propylene oxide copolymer added ranges from approximately 1 to 20 ppm.

\* \* \* \* \*

UNITED STATES PATENT AND TRADEMARK OFFICE
CERTIFICATE OF CORRECTION

PATENT NO. : 5,624,575
DATED      : April 29, 1997
INVENTOR(S): ROBERT J. MEADE, ET AL It is certified that error appears in the above-indentified patent and that said Letters Patent is hereby corrected as shown below:

COLUMN 8, LINE 41, CLAIM 13

13. The method of claim 10 wherein the wherein the

LETTERS PATENT SHOULD READ AS:

13. The method of claim 10 wherein the

Signed and Sealed this

Eighth Day of July, 1997

Attest:

BRUCE LEHMAN

Attesting Officer

Commissioner of Patents and Trademarks